United States Patent [19]
Reid

[11] Patent Number: 5,982,614
[45] Date of Patent: Nov. 9, 1999

[54] DOCKING STATION INCLUDING A PORT REPLICATOR FOR SHARING PERIPHERALS BETWEEN A PORTABLE COMPUTER AND DESKTOP COMPUTER

[75] Inventor: Michael C. Reid, Woodland Hills, Utah

[73] Assignee: Peripheral Vision, Inc., Woodland Hills, Utah

[21] Appl. No.: 08/755,753

[22] Filed: Nov. 18, 1996

[51] Int. Cl.⁶ .................................. G06F 1/16; H05K 7/10
[52] U.S. Cl. ........................................................... 361/686
[58] Field of Search ............................ 439/52, 505, 638; 364/708.1; 361/686

[56] References Cited

U.S. PATENT DOCUMENTS

| | | |
|---|---|---|
| 4,769,764 | 9/1988 | Levanon . |
| 5,301,346 | 4/1994 | Notarianni et al. ................ 361/686 X |
| 5,438,671 | 8/1995 | Miles . |
| 5,457,785 | 10/1995 | Kikinis et al. . |
| 5,528,758 | 6/1996 | Yeh . |
| 5,540,597 | 7/1996 | Budman et al. . |

*Primary Examiner*—Michael W. Phillips
*Attorney, Agent, or Firm*—Thorpe, North & Western, LLP

[57] ABSTRACT

An improved port replicator for sharing peripheral devices between a portable computer and a desktop computer. The improved docking station including a docking station provides the ability to connect the ports of the two computers as well as to share peripherals between the computers. These interconnections are accomplished by means of a switch mechanism on the improved docking station and port replicator. The improved docking station and port replicator is realized by connecting a custom 50-pin cable between a desktop computer and docking station. The docking station includes a custom adapter for transferring the desired electrical signals from the desktop to either a portable computer at the docking station, the peripheral devices connected to the docking station, or to both the portable computer and the peripheral devices.

16 Claims, 3 Drawing Sheets

DOCKING STATION INCLUDING A PORT REPLICATOR FOR SHARING PERIPHERALS BETWEEN A PORTABLE COMPUTER AND DESKTOP COMPUTER

BACKGROUND OF THE INVENTION

1. The Field of the Invention

This invention relates generally to docking stations and port replicators that are used to attach peripheral devices to portable computers. More particularly, this invention concerns a port replicator for selectively attaching peripheral devices to either a portable computer or a desktop computer, i.e., the invention concerns a port replicator that allows for the sharing of peripheral devices between a portable computer and a desktop computer.

2. The Background Art

It is known in the art to use docking stations and port replicators to attach a set of peripheral devices to a portable or laptop computer. When in use, a docking station will have a set of peripheral devices connected to it. In addition, the docking station has a bay for receiving or mechanically coupling to a portable computer. The bay allows the portable computer to be easily connected to or removed from the docking station. When the portable computer is connected to the docking station, the portable computer is electrically connected to the docking station and has access to the peripheral devices that are connected to the docking station.

Docking stations usually provide slots for expansion cards and bays for CD-ROMs and hard drives. Some docking stations have multimedia speakers and a stand or platform for an external monitor to sit upon. Other peripheral devices that can be connected to a docking station are the following: a keyboard, a mouse, a printer, small system computer interface (SCSI) devices, personal computer memory card international association (PCMCIA) adapters, token ring connections, ethernet connections, and other standard computer networking devices. These standard interconnection devices are acknowledged within this application to represent those standards which exist at the date of filing of the present application. In addition, recent developments in docking stations provide means for "hot docking."

Hot docking occurs when a portable computer remains powered on as it is connected to a docking station. The portable computer will acquire complete access to the peripheral devices immediately upon connection to the docking station. Hot docking is desirable because the portable computer does not need to be re-booted to obtain access to the peripherals.

Like docking stations, port replicators are used to attach a set of peripheral devices to a portable or laptop computer. However, port replicators tend to be smaller than docking stations and are not as readily expandable as a docking station. Port replicators perform essentially the same function as a docking station. It is often difficult to distinguish between a docking station and a port replicator. Port replicators will commonly provide connections for the following peripheral devices: a monitor, a keyboard, a mouse, a printer, SCSI devices, PCMCIA devices, ethernet connections, token ring connections, or any combination thereof. Thus, the name "port replicator" is often used interchangeably with the name "docking station."

Also known in the art is a desktop computer used as a docking station. Although this system eliminates the need for a separate docking station or port replicator, a drawback is that the system requires a complex combination of cables and software. Another drawback is that the system requires that a portable computer have a 25-pin parallel port to function with the desktop computer docking station, otherwise, the portable computer will not be compatible with the system. These systems are also known to be susceptible to timing problems and are extremely unreliable.

Although docking stations and port replicators are desirable for the ease with which they enable a user to attach peripherals to a portable computer, the docking stations and port replicators of the prior art lack the ability to share peripherals between a portable computer and a desktop. Thus, docking stations are inconvenient for users of both a portable computer and a desktop computer.

For example, a docking station is undesirable when a user desires to use the same printer for both the portable computer and the desktop computer. To switch the printer from the portable computer to the desktop computer is inconvenient. It requires that the user unplug the printer cable from the docking station and then plug the printer cable into the printer port of the desktop computer. When a user desires to quickly switch the printer from the portable computer to the desktop computer, changing a cable connection can be annoying, time consuming, and sometimes extremely difficult for the user. The cables are often underneath tables or desks and difficult to access. In addition, some users are unfamiliar with computer peripherals and do not understand which cable to unplug and where the cable should be connected.

Of current interest is an improved port replicator that overcomes the disadvantages of the prior art. The present invention is a port replicator that connects a set of peripheral devices to both a portable computer and a desktop computer. Unlike the software handshaking of a network, the port replicator for sharing peripherals provides manually selectable hardware connections for a single set of peripheral devices. Additionally, although devices exist that allow a monitor, keyboard, and mouse to be shared between multiple central processing units (CPUs), until the present invention, no device has been made that provides a means for sharing peripherals between a portable computer and a desktop computer. The port replicator for sharing peripherals overcomes the shortcomings of the prior art and provides a means to selectively connect a set of peripheral devices to both a desktop and a portable computer.

OBJECTS AND SUMMARY OF THE INVENTION

It is an object of the present invention to provide a docking station for attaching a portable computer, a desktop computer, and external computer peripherals, and to provide a way to selectively share the external computer peripherals between the portable computer and the desktop computer.

It is another object of the present invention to provide a custom cable for attaching a desktop computer to a docking station so that the docking means can control the electrical signals that are exchanged between the docking means and the desktop computer.

It is another object of the present invention to provide an adapter for controlling the electrical signals between a desktop computer, a portable computer, and a set of peripheral devices so that the path of the electrical signals can be altered with the adjustment of a switch.

It is yet another object, in accordance with one aspect thereof, to provide a switch for selectively connecting a portable computer to a desktop computer and further selectively connecting peripheral devices between the two computers.

It is another object of the present invention to provide a method whereby a user of both a portable computer and a desktop computer can manually select an arrangement for the two computers and further select an arrangement for connecting peripheral devices into the two computer arrangement.

The above objects and others not specifically recited are realized through a port replicator for sharing peripherals. The port replicator for sharing peripherals enables a user to manually select which peripherals are to be attached to a portable computer when the portable computer is mounted in the port replicator for sharing peripherals. The user may elect to attach all available peripherals to the portable computer, or the user may discriminate in favor of a single peripheral. The peripheral devices that the user does not select may be accessible to a desktop computer. The desktop computer, in addition to having access to peripheral devices through the port replicator, may also be connected to the portable computer through the port replicator.

Additional objects and advantages of the invention will be set forth in the description which follows, and in part will be apparent from the description, or may be learned by the practice of the present invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
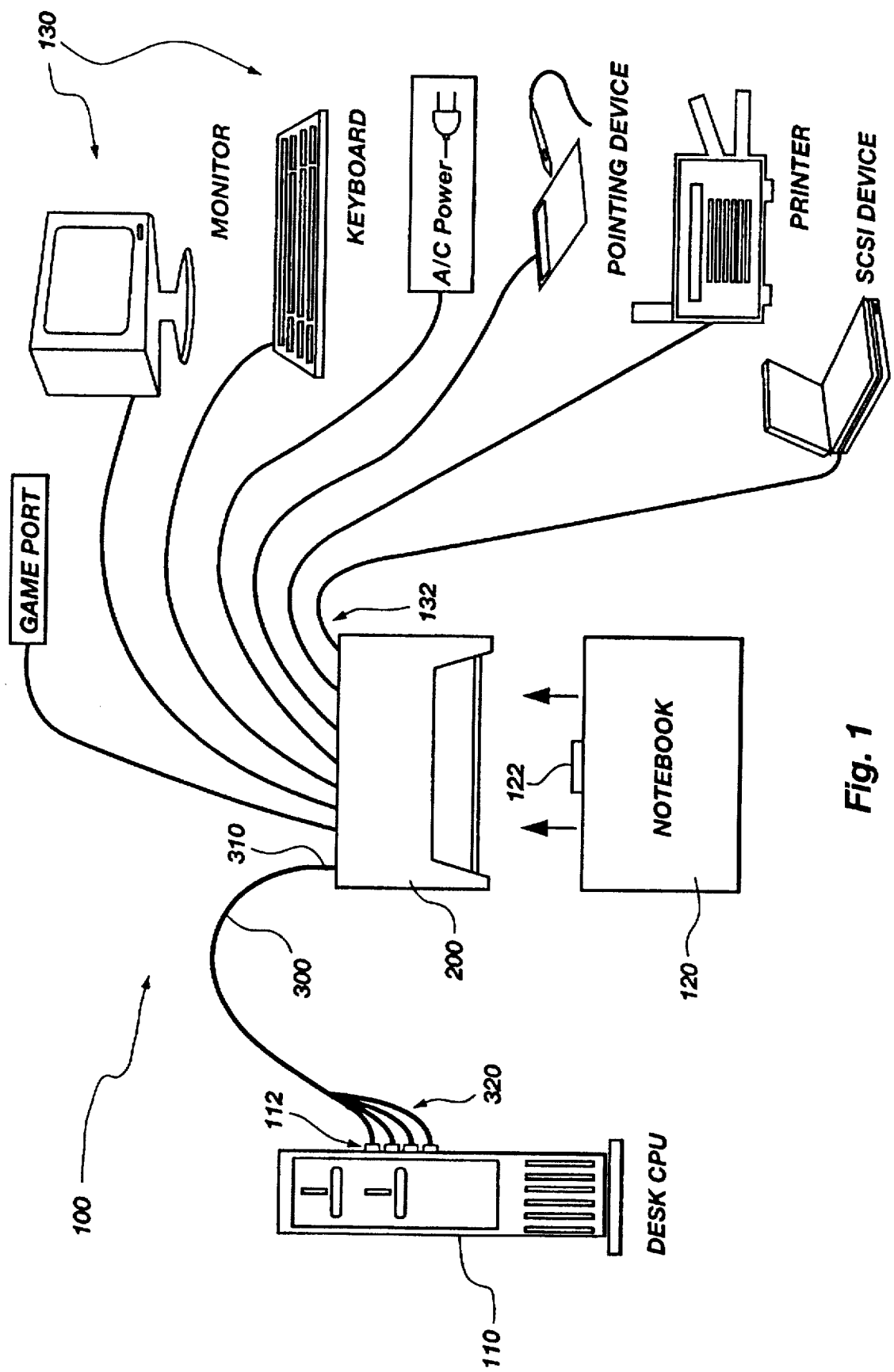
FIG. 1 is a perspective view of the PORT REPLICATOR FOR SHARING PERIPHERALS and a possible configuration of a desktop computer, portable computer and peripheral devices.

Reference will now be made to the drawings wherein like structures will be provided with like reference numerals.

FIG. 1 illustrates a system 100 for selectively and separately interconnecting a portable computer 120 through a docking station 200 (referred to hereafter as "docking means") to a desktop computer 110 and external peripheral devices 130. The desktop computer 110 is a typical computer that has a plurality of input/output (I/O) ports 112 for electrically coupling with external devices. An I/O port is essentially a location on the computer where electrical signals are transferred between the computer's central processing unit and an external device. This interface is known in the art as an I/O port and at least one I/O port will be found on nearly every model of computer.

Although numerous different models of desktop computers exist, the desktop computer 110 of FIG. 1 is representative of all models of desktop computers that are used at home, in the office, under a desk, on a desk, or that are designed to remain in a relatively fixed position. A typical desktop computer does not have its own power source.

FIG. 1 also illustrates a portable computer 120. Like desktop computers, portable computers come in all shapes, sizes and models. Portable computers are often referred to as notebook computers, laptop computers, or even mobile computers. An important distinction of a portable computer is that it is designed for mobile use. Mobile use is made possible because a portable computer is operable on its own power supply. Some portable computers are customized for docking stations or port replicators. The portable computer 120 illustrated in FIG. 1 represents those computers that are inserted into a docking station or port replicator. The portable computer 120 has at least one I/O port 122 for electrically coupling with external devices. Although the portable computer 120 may have more than one I/O port 122, many portable computers that are designed to be used in a docking station no longer have more than one I/O port. Thus, the portable computer 120 has at least one I/O port 122.

FIG. 1 also illustrates a plurality of peripheral devices 130. Each of the peripheral devices 130 has an I/O port 132. As illustrated, the I/O ports 132 are connected to a docking means 200. After being connected to the docking means 200, these I/O ports 132 of the peripheral devices 130 may be electrically coupled with either the plurality of I/O ports 112 of the desktop computer 110 or the at least one I/O port 122 of the portable computer 120. This electrical coupling occurs through the docking means 200.

Figure 2:
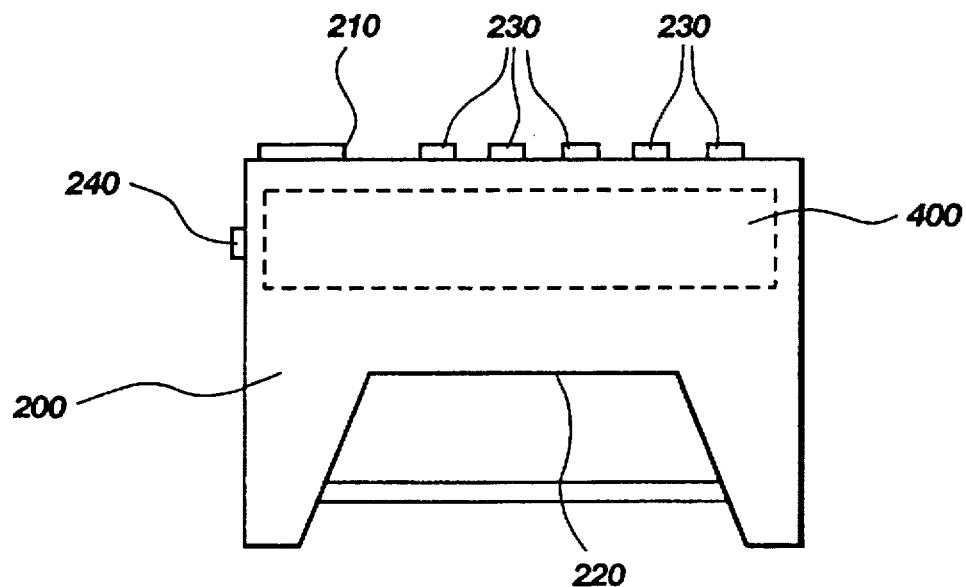
FIG. 2 is a top view of the DOCKING STATION INCLUDING A PORT REPLICATOR FOR SHARING PERIPHERALS BETWEEN A PORTABLE COMPUTER AND DESKTOP COMPUTER and the figure includes a transparent view of the internal circuitry of the port replicator.

FIG. 2 shows the docking means 200 in greater detail than FIG. 1. The docking means 200 has internal circuitry (or an adapter) 400 for selectively interconnecting the I/O ports 132 of the plurality of peripheral devices 130. The internal circuitry 400 will be described in greater detail below.

As shown in FIG. 2, the docking means 200 has separate ports 230 for connecting the I/O ports 132 of the peripheral devices 130. The I/O ports 132 may then be connected with either the I/O ports 112 of the desktop computer 110 or the I/O port(s) 122 of the portable computer 120. In addition, the docking means 200 has a peripheral selective switch mechanism comparable to manual switch 240 to control the internal circuitry 400. The manual switch 240, as illustrated, is a single switch, however, the manual switch 240 can be more than a single physical switch.

The manual switch 240 represents the capability to embody numerous physical switches. In addition, the manual switch 240 can be a button or a plurality of buttons. The manual switch 240 may also be activated through a mouse click or through voice activation. The word "manual" is used to describe the switch 240 only to emphasize that to activate the switch requires some form of action.

When more than one physical switch is used to make up the manual switch 240 then more settings are available for selectively interconnecting the I/O ports 132 of the peripheral devices 130 with the I/O ports 112 of the desktop computer and the I/O port(s) 122 of the portable computer 120.

A preferred embodiment of the present invention is to configure the manual switch 240 to have a first setting for electrically coupling the I/O ports 132 of the peripheral devices 130 with the I/O ports 112 of the desktop computer 110. In addition, the manual switch 240 will also have a second setting for electrically coupling the I/O ports 132 of the peripheral devices 130 with the I/O port(s) 122 of the portable computer 120.

Finally, the manual switch 240 has a setting wherein the I/O port(s) 122 of the portable computer 120 are electrically coupled to the I/O ports 112 of the desktop computer 110. It should be noted that this description of settings for the manual switch 240 is not intended to limit the possible settings of the manual switch 240.

In the presently preferred embodiment, the I/O ports 112 of the desktop computer 110 are for parallel, serial, monitor, and keyboard connections. In practice, the desktop computer 110 may have I/O ports 112 for a monitor, a keyboard, a mouse, a serial interface, a parallel interface, a small computer system interface (SCSI), and a personal computer memory card international association (PCMCIA) interface. One skilled in the art will recognize that these are only examples of some of the I/O ports that a desktop computer may have. Other examples are possible and will function with the present invention.

Examples of the function of the I/O port(s) 122 of the portable computer 120 are similar to the desktop computer 110. The I/O port(s) 122 of the portable computer 120 are typically for a monitor, a keyboard, a mouse, a serial interface, a parallel interface, a small computer system interface (SCSI), and a personal computer memory card international association (PCMCIA) interface. These I/O ports are exemplary in nature and are not intended to limit the I/O port functions that are possible.

Of note in the art of I/O ports for a portable computer is the fact that portable computers are now being designed to have a single I/O port 122. This I/O port 122 interfaces with a central processing unit (CPU) of the portable computer 120 to perform essentially the same function as multiple I/O ports 122 on a portable computer. The single I/O port 122 is becoming more popular with the increase in popularity of docking stations.

The I/O ports discussed above are useful for various type of peripheral devices. For example, the peripheral devices 130 to be used in this invention could be any peripheral device that uses a serial port, a parallel port, a small computer system interface (SCSI) port, a personal computer memory card international association (PCMCIA) port, or a game port. These examples are not inclusive, but only to present possible peripheral devices for the present invention. Peripheral devices that fit the above categories are the following: monitors, keyboards, power supplies, pointing devices, mice, printers, game devices, SCSI devices, and PCMCIA devices.

Figure 4:
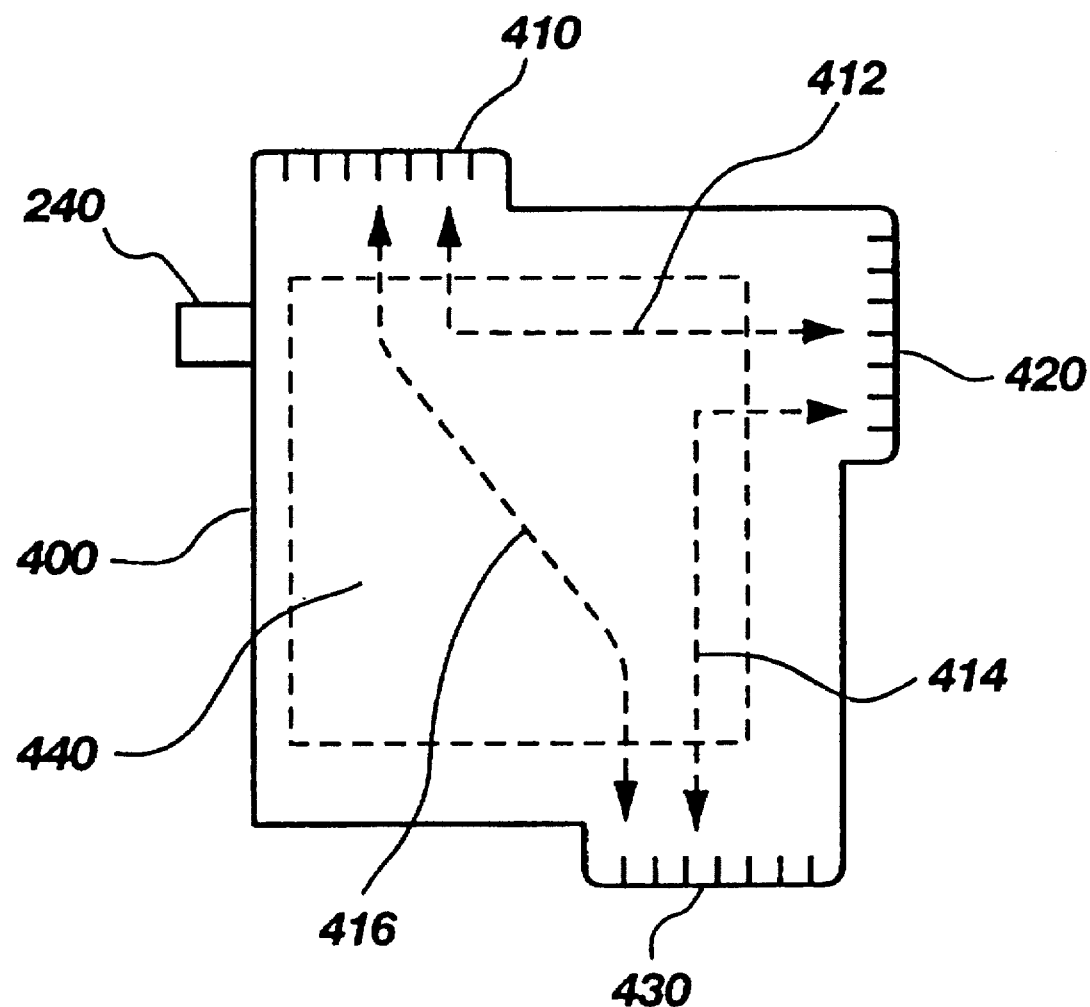
FIG. 4 is a top view of an adapter that is located within the DOCKING STATION INCLUDING A PORT REPLICATOR FOR SHARING PERIPHERALS BETWEEN A PORTABLE COMPUTER AND DESKTOP COMPUTER, the adapter is used to control the electrical signals that are transported between a desktop computer, a portable computer, and peripheral devices.

An essential feature of the present invention is shown in FIGS. 2 and 4. These figures show the feature of internal circuitry 400 of the docking means 200. This internal circuitry 400 is for selectively coupling the I/O ports 132 of the peripheral devices 130 to either the I/O ports 112 of the desktop computer 110 or the I/O port(s) 122 of the portable computer 120. In addition, the internal circuitry 400 is for selectively coupling the I/O port(s) 122 of the portable computer 120 with the I/O ports 112 of the desktop computer 110.

FIG. 4 shows the significant elements of the internal circuitry 400. The internal circuitry 400 has a first input means 410. This first input means 410 is for electrically coupling to the I/O ports 112 of the desktop computer 110. In addition, the internal circuitry 400 has a second input means 430 for electrically coupling to the I/O port(s) 122 of the portable computer 120. Finally, the internal circuitry has a output means 420 for electrically coupling to the I/O ports 132 of the peripheral devices 130.

The first input means 410, second input means 430, and output means 420 can interconnect in various electrical configurations. The interconnection is determined by control circuitry 440 within the internal circuitry 400. In one communication link 412, the control circuitry 440 is used for processing electrical signals between the first input means 410 and the output means 420. In another communication link 414, the control circuitry 440 is used for processing electrical signals between the second input means 430 and the output means 420. In yet another communication link 416, the control circuitry 440 is used for processing electrical signals between the first input means 410 and the second input means 430.

When electrical signals are processed between the first and second input means 410, 430 a communication link 416 is formed between the desktop computer 110 and the portable computer 120. This communication link 416 can be a standard parallel interface, a null modem parallel interface, or a bi-directional interface.

Standard parallel interfaces are well known in the art of computer communications. The null modem parallel cable is a 4-bit parallel interface.

Bi-directional communication links are another link that can be used between the portable computer 120 and the desktop computer 110. Two examples of bi-directional links are the enhanced capabilities port (ECP) and the enhanced parallel port (EPP). The bi-directional links significantly improve the speed of data communication between the two computers.

The different configurations described above are possible because the internal circuitry 400 includes switching means 240. The switching means 240 is for selectively switching among the three settings. Although three settings are described, multiple settings are possible for multiple functions. For example, the switching means 240 can be configured to electrically couple some peripherals 130 to the desktop computer 110 while at the same time electrically coupling other peripherals 130 to the portable computer 120.

In addition, the control circuitry 440 can provide means for electrically coupling a monitor to the internal circuitry 400 so that the monitor simultaneously receives electrical signals from both the desktop computer 110 and the portable computer 120, thereby enabling the monitor to display a split screen wherein one portion of the screen displays electrical signals from the portable computer 120 while another portion of the screen displays electrical signals from the desktop computer 110.

Figure 3:
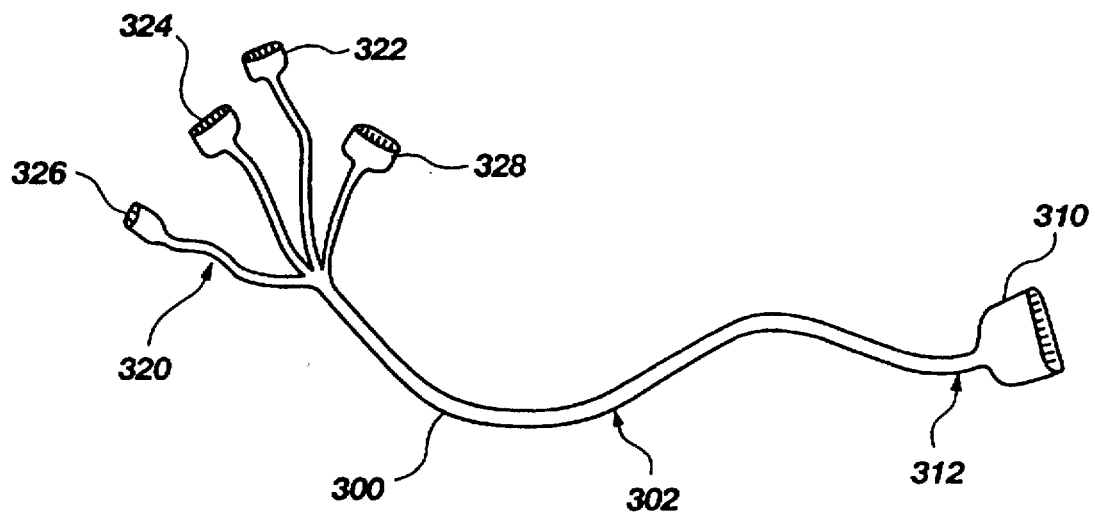
FIG. 3 is a side view of the cable that is used to connect a desktop computer to the DOCKING STATION INCLUDING A PORT REPLICATOR FOR SHARING PERIPHERALS BETWEEN A PORTABLE COMPUTER AND DESKTOP COMPUTER the cable shows a proprietary 50-pin terminator on one end and a plurality of terminators on the other end for connecting with multiple input/output (I/O) ports of a desktop computer.

A final element in the system 100 of FIG. 1 is a cable 300. The cable 300 is a critical element for the system 100 that selectively and separately interconnects a desktop computer 110, a portable computer 120 and a plurality of external peripheral devices 130. The cable 300, as shown in FIG. 3, has a first end 320 that has a plurality of terminators 322, 324, 326, 328. These terminators 322, 324, 326, 328 electrically couple with the plurality of I/O ports 112 of the desktop computer 110.

The cable 300 has a second end 312 that has at least one terminator 310 for electrically coupling with the docking means 200. As illustrate in FIG. 3, this electrical coupling occurs at a socket 210 (shown in FIG. 2) that couples with the first input means 410 of the internal circuitry 400 of the docking means 200. This electrical coupling creates the embodiment wherein the I/O ports 112 of the desktop computer 110 are selectively coupled to the peripheral devices 130. Of course, the cable 300 has an intermediate section 302 for electrically coupling the first end 320 of the cable to the second end 312 to thereby transfer data between the first end 320 and the second end 312.

The terminators 322, 324, 326, 328 on the first end 320 of the cable 300 can be designed for electrically coupling with a parallel port, a serial port, a monitor port, and a keyboard port. The terminators 322, 324, 326, 328 shown are those of the presently preferred embodiment. However, additional terminators could be added to interface with additional I/O ports on the desktop computer 110.

The second end 312 of the cable 300 currently includes at least one terminator 310. Although the terminator 310 is currently designed to electrically couple with a 50-pin socket 210 disposed in the docking means 200, the terminator 310 could include a plurality of connections. The plurality of connections would be those used in current technology as well as those connections that are developed in the future. The socket 210 is the external interface for the internal circuitry 400 of the docking means 200. The socket 210 is designed to mate with the terminator(s) 310 on the second end 312 of the cable 300.

The method for selectively interconnecting computers and peripherals is fairly simple and straight forward. The simplicity of using the invention is one of the points of novelty in the invention. A user could adhere to the following steps to use the device of the present invention: (1) obtain a desktop computer having a plurality of input/output (I/O) ports; (2) obtain a portable computer having at least one I/O port; (3) obtain a plurality of peripheral devices; (4) provide a docking means having internal circuitry controlled by a manual switch for selectively interconnecting the I/O ports of the plurality of peripheral devices with either the plurality of I/O ports of the desktop computer or the at least one I/O port of the portable computer; and (5) switch the I/O ports of the plurality of peripheral devices between the plurality of I/O ports of the desktop computer and the plurality of I/O ports of the portable computer.

In summary, the invention is essentially a docking means 200 for selectively and separately interconnecting a portable computer 120 to a desktop computer 110 and to external peripheral devices 130. The docking means 200 has a first connector, a second connector, a third connector, and internal circuitry (or an adapter). The first connector has means for coupling to a plurality of input/output (I/O) ports 112 of a desktop computer 110.

The second connector has means for coupling to at least one I/O port 122 of a portable computer 110. The third connector has means for coupling to I/O ports 132 of a plurality of peripheral devices 130.

For the docking means 200 to function as desired, it must have internal circuitry 400. This internal circuitry 400 is used for selectively interconnecting at least one I/O port 112 of the desktop computer 110 with at least one I/O port 122 of the portable computer 120. In addition to the connection between computers, the internal circuitry 400 is also used for further selectively interconnecting the I/O ports 132 of the plurality of peripheral devices 130 with either the plurality of I/O ports 112 of the desktop computer 110 or the at least one I/O port 122 of the portable computer 120.

The docking means 200 will have a manual switch 240 electrically coupled to the internal circuitry 400 to control the internal circuitry 400. The manual switch 240 will have a plurality of settings for selectively interconnecting the I/O ports 132 of the plurality of peripheral devices 130 with either the plurality of I/O ports 112 of the desktop computer 110 or the at least one I/O port 122 of the portable computer 120. The manual switch 240 will have a first setting for electrically coupling the I/O ports 132 of the plurality peripheral devices 130 with the plurality of I/O ports 112 of the desktop computer 110. In addition, the manual switch 240 will have a second setting for electrically coupling the I/O ports 132 of the plurality of peripheral devices 130 with the at least one I/O port 122 of the portable computer 120. Finally, the manual switch 240 will have other settings for electrically coupling the I/O ports 112 of the desktop computer 110 to the I/O port(s) 122 of the portable computer 120.

The above variations are not inclusive. They are only examples of the preferred embodiments. It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A system for selectively and separately interconnecting a portable computer through a docking station to a desktop computer and external peripheral devices, the system comprising:

a desktop computer having a plurality of input/output (I/O) ports for electrically coupling with external devices;

a portable computer having at least one I/O port for electrically coupling with external devices;

a plurality of peripheral devices each having an I/O port for electrically coupling with either the plurality of I/O ports of the desktop computer or the at least one I/O port of the portable computer;

a docking station for electrically and mechanically coupling with the portable computer, and electrically coupling with (i) the desktop computer, and (ii the plurality of peripheral devices, and having internal circuitry for selectively interconnecting the I/O ports of the plurality of peripheral devices to either the plurality of I/O ports of the desktop computer or the at least one I/O port of the portable computer;

said docking station having a peripheral selective switch mechanism to control the internal circuitry, the peripheral selective switch mechanism having a plurality of settings for selectively interconnecting the I/O ports of the plurality of peripheral devices with either the plurality of I/O ports of the desktop computer or the at least one I/O port of the portable computer, the peripheral selective switch mechanism having a first setting for electrically coupling the I/O ports of the plurality of peripheral devices with the plurality of I/O ports of the desktop computer, the peripheral selective switch mechanism having a second setting for electrically coupling the I/O ports of the plurality of peripheral devices with the at least one I/O port of the portable computer wherein the portable computer controls operation of the plurality of peripheral devices.

2. The system of claim 1 wherein the peripheral selective switch mechanism has a third setting for electrically coupling the at least one I/O port of the desktop computer.

3. The system of claim 1 wherein the plurality of I/O ports of the desktop computer comprises I/O ports for a monitor, a keyboard, a mouse, a serial interface, a parallel interface, a small computer system interface (SCSI), and a personal computer memory card international association (PCMCIA) interface.

4. The system of claim 1 wherein the portable computer comprises a computer designed to be operable on its own power supply.

5. The system of claim 4 wherein the at least one I/O port of the portable computer comprises I/O ports for a monitor, a keyboard, a mouse, a serial interface, a parallel interface, a small computer system interface (SCSI), and a personal computer memory card international association (PCMCIA) interface.

6. The system of claim 4 wherein the portable computer includes a central processing unit (CPU) and the at least one I/O port of the portable computer comprises a single I/O port for electrically coupling the plurality of peripheral devices to the CPU and for mechanically coupling with the docking station.

7. The system of claim 4 wherein the portable computer is selected from the group consisting of laptop computers, and notebook computers.

8. The system of claim 1 wherein the plurality of peripheral devices comprise peripheral devices that use a serial port, a parallel port, a small computer system interface (SCSI) port, a personal computer memory card international association (PCMCIA) port, or a game port.

9. The system of claim 1 wherein the plurality of peripheral devices is selected from the group consisting of monitors, keyboards, power supplies, pointing devices, mice, printers, game devices, SCSI devices, and PCMCIA devices.

10. The system of claim 1 wherein the internal circuitry of the docking station comprises:

a first input means for electrically coupling to the plurality of I/O ports of the desktop computer;

output means for electrically coupling to the I/O ports of the plurality of peripheral devices; and control circuitry for processing electrical signals between said first input means and said output means.

11. The system of claim 1 wherein the internal circuitry of the docking station comprises:

a second input means for electrically coupling to the at least one I/O port of the portable computer;

output means for electrically coupling to the I/O ports of the plurality of peripheral devices; And control circuitry for processing input signals between said second input means and said output means.

12. The system of claim 1 wherein the internal circuitry of the docking station includes switching means for selectively switching the electrical coupling with the I/O ports of the plurality of peripheral devices to either the plurality of I/O ports of the desktop computer or the at least one I/O port of the portable computer.

13. The system of claim 1 wherein the system includes a cable that selectively and separately interconnects the desktop computer, the portable computer and the plurality of external peripheral devices, the cable comprising:

a first end, said first end having a plurality of terminators for electrically coupling with the plurality of I/O ports of the desktop computer;

a second end, said second end having at least one terminator for electrically coupling with the docking station, wherein the plurality of I/O ports of the desktop computer are selectively coupled to the plurality of peripheral devices; and an intermediate section for electrically coupling the first end of the cable to the second end of the cable to thereby transfer data between the first end and the second end.

14. A method for selectively interconnecting computers and peripherals, the method comprising:

obtaining a desktop computer having a plurality of input/output (I/O) ports;

obtaining a portable computer having at least one I/O port;

obtaining a plurality of peripheral devices each having an I/O port;

providing a docking station having internal circuitry controlled by a peripheral selective switch mechanism for selectively interconnecting the I/O ports of the plurality of peripheral devices with either the plurality of I/O ports of the desktop computer or the at least one I/O port of the portable computer;

mechanically coupling the portable computer with the docking station and electrically coupling the plurality of I/O ports of the desktop computer, the at least one I/O port of the portable computer, and the I/O ports of the plurality of peripheral devices with the docking station; and switching the I/O ports of the plurality of peripheral devices between the plurality of I/O ports of the desktop computer and the at least one I/O port of the portable computer.

15. A docking station for selectively and separately interconnecting a portable computer to a desktop computer and to external peripheral devices, the docking station comprising:

a first connector having means for coupling to a plurality of input/output (I/O) ports of a desktop computer, the plurality of I/O ports being configured for use with external devices;

a second connector having means for coupling to at least one I/O port of a portable computer, the at least one I/O port being configured for use with external devices;

a third connector having means for coupling to I/O ports of a plurality of peripheral devices;

internal circuitry within the docking station for selectively interconnecting at least one I/O port of the desktop computer with at least one I/O port of the portable computer and for further selectively interconnecting the I/O ports of the plurality of peripheral devices with either the plurality of I/O ports of the desktop computer or the at least one I/O port of the portable computer;

means for mechanically coupling the portable computer with the docking station;

said docking station having a peripheral selective switch mechanism electrically coupled to the internal circuitry to control the internal circuitry, the switch mechanism having a plurality of settings for selectively interconnecting the I/O ports of the plurality of peripheral devices with either the plurality of I/O ports of the desktop computer or the at least one I/O port of the portable computer, the switch mechanism having a first setting for electrically coupling the I/O ports of the plurality of peripheral devices with the plurality of I/O ports of the desktop computer, the switch mechanism having a second setting for electrically coupling the I/O ports of the plurality of peripheral devices with the at least one I/O port of the portable computer.

16. The docking station of claim 15 wherein the manual switch mechanism has a third setting for electrically coupling at least one I/O port of the portable computer to at least one I/O port of the desktop computer.

* * * * *